Sept. 12, 1939.                    C. G. KRONMILLER                    2,172,820
                                      THERMOSTAT
                                  Filed Aug. 28, 1936            3 Sheets-Sheet 1

INVENTOR
Carl G. Kronmiller
BY HIS ATTORNEY
George H Fisher

Sept. 12, 1939.   C. G. KRONMILLER   2,172,820
THERMOSTAT
Filed Aug. 28, 1936   3 Sheets-Sheet 2
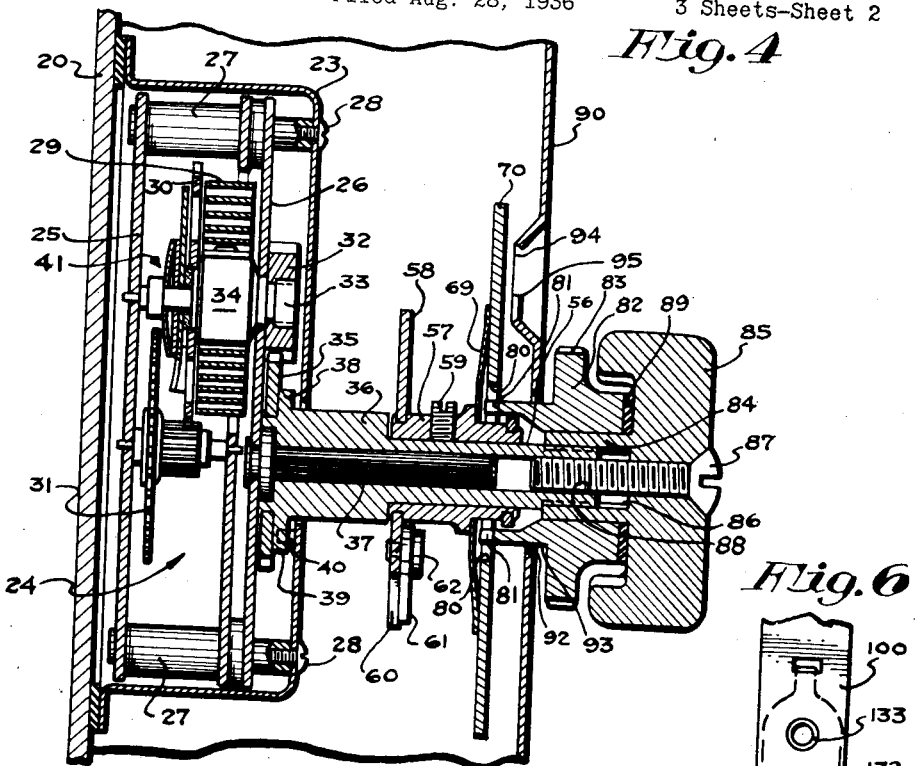
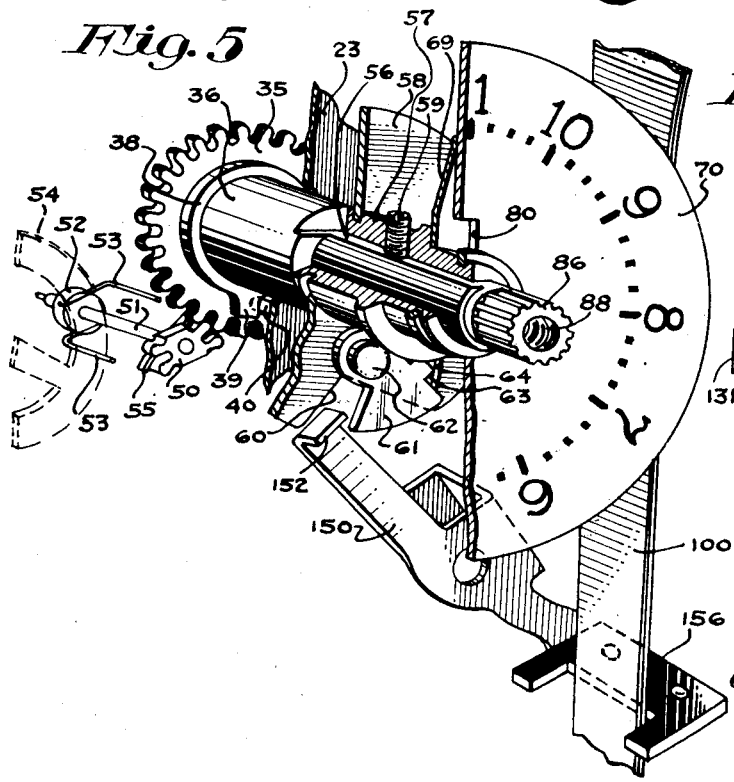
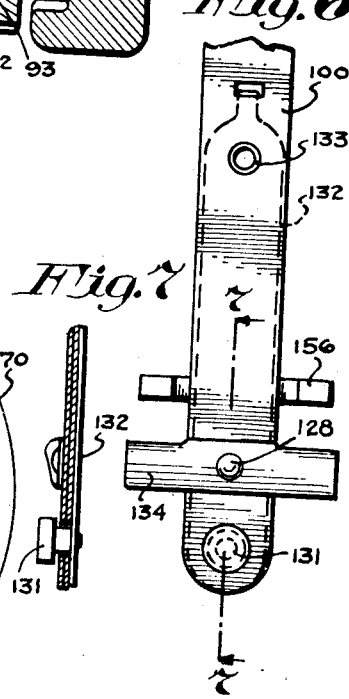
INVENTOR
Carl G. Kronmiller
BY HIS ATTORNEY
George H Fisher Sept. 12, 1939.  C. G. KRONMILLER  2,172,820
THERMOSTAT
Filed Aug. 28, 1936   3 Sheets-Sheet 3
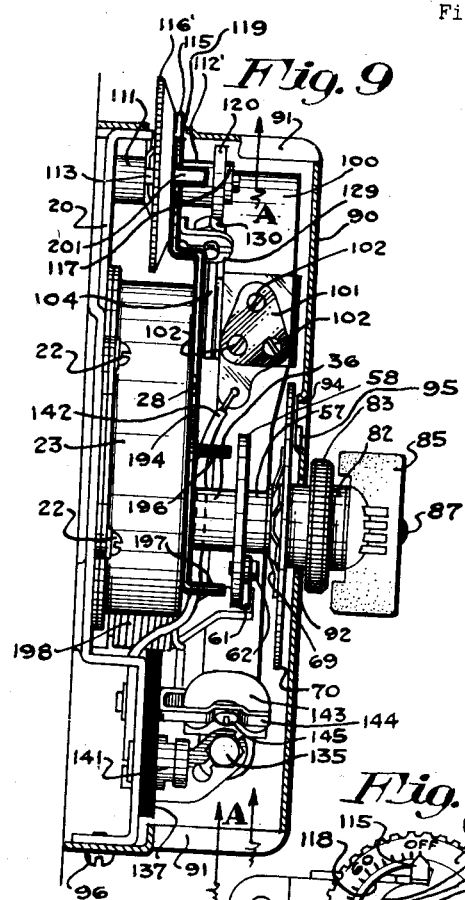
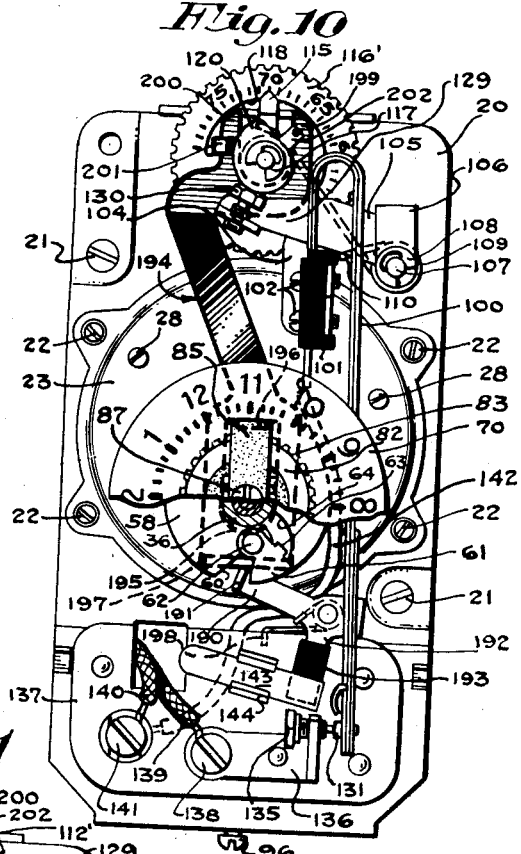
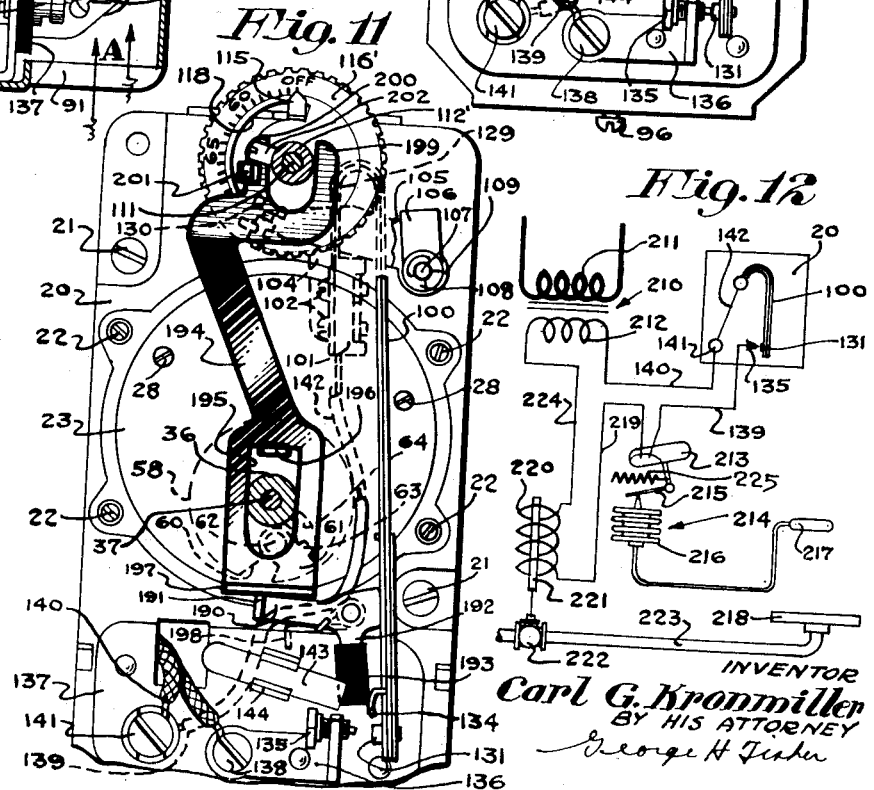
INVENTOR
Carl G. Kronmiller
BY HIS ATTORNEY
George H. Fisher Patented Sept. 12, 1939

2,172,820

UNITED STATES PATENT OFFICE

2,172,820

THERMOSTAT

Carl G. Kronmiller, Minneapolis, Minn., assignor to Minneapolis-Honeywell Regulator Company, Minneapolis, Minn., a corporation of Delaware Application August 28, 1936, Serial No. 98,326

26 Claims. (Cl. 200—139)

This invention relates to thermostats and more particularly to a type of thermostatic appliance designed to be controlled by a timed mechanism.

One object of this invention is the provision of an improved thermostatic appliance having in association therewith clockwork or similar mechanism designed to hold a thermostatic element bearing a contact in or out of engagement with an opposed stationary contact.

A further object of the invention is the provision of an improved means for setting a clock mechanism associated with a thermostat in such manner that the duration of the interval during which a contact carried by the thermostatic element is held in or out of engagement with an opposed contact may be readily predetermined.

A further object is the provision of indicating means calibrated in such a manner that the duration of the time during which the contacts are held open or closed may be readily determined at a glance.

As conducive to a clearer understanding of the objects and purposes of this invention, it may here be pointed out that in a heat control system it is frequently desirable that the temperature value to which temperature controlling mechanism responds be lowered for a predetermined period, as for example, during the night or during such periods as the residents of the house, or other place where the thermostat may be located, are out. On such occasions it is advantageous to provide a simple mechanism whereby the temperature to which the heating plant responds may be lowered and subsequently raised again prior to the time of rising or re-occupancy of the dwelling. One subject of this invention is to provide an improved mechanism whereby such a change may be readily accomplished and the duration of such change readily determined in advance. As for example, if the resident leaves the house for a period of five hours, he may set the thermostatic mechanism of the instant invention for a period of, illustratively, four hours whereby during the first four hours of his absence the heat controlling mechanism responds to a temperature value of, illustratively, 60°, but an hour before his return the temperature value to which the heating mechanism responds is raised to, illustratively, 70°, whereby the dwelling reaches this latter temperature before his return. Means to be hereinafter described are also provided whereby the temperature values to which the device responds may be readily varied in accordance with the wishes of the operator.

The thermostatic mechanism to be hereinafter described may be advantageously utilized in association with a second thermostat of conventional design. A suitable method of associating the thermostat of the instant invention with a conventional room thermostat will be hereinafter described in detail. When such a second thermostat is utilized, the arrangement is such that upon setting the mechanism of the instant invention to operate for a predetermined period the said mechanism serves to energize or deenergize the heat controlled mechanism at a predetermined desired temperature which may be anywhere within the effective limits of adjustment of the instrument, as for example, the above mentioned temperature of 60°. At the termination of the operating period the control of the heat controlled mechanism is returned or transferred to the second or conventional room thermostat which may be set at any desired temperature as, illustratively, the above mentioned 70°.

Under certain circumstances as, illustratively, in warm climates it is sometimes desirable that the heating mechanism associated with a residence or other building be permitted to operate for only a relatively short period during each day and that at all times with the exception of this period it be definitely precluded from operating regardless of the temperature of the building.

In a modified form of the invention to be described hereinafter means are provided whereby upon setting the timed mechanism of the instant invention, a burner or other heating mechanism is energized only for the period for which the timed mechanism is set provided the temperature falls below the predetermined point at which the instrument is set, means being provided whereby subsequent to the termination of such an operating period the energization of the burner is positively precluded until such time as the mechanism is reset.

Other objects will in part be obvious and in part pointed out hereinafter.

The invention, accordingly, consists in the combination of parts, arrangements of elements and features of construction all as will be more fully described hereinafter and shown in the accompanying drawings and the scope of the application of which will be indicated by the appended claims.

In the drawings wherein are shown two illustrative embodiments of this invention:

Figure 4 is an enlarged sectional view of certain portions of the mechanism as shown in Figure 1, certain other portions being removed for the sake of clarity;

Figure 5 is a perspective view of certain details of construction;

Figure 6 is an enlarged detailed view of certain portions of the mechanism;

Figure 7 is a side sectional elevational view taken along line 7—7 of Figure 6 as viewed from the right;

Figure 9 is a side sectional elevational view of a modified form of structure embodying the invention;

Figure 10 is a front elevational view of the structure shown in Figure 9, certain parts thereof being removed for the sake of clarity;

Figure 11 is a view similar to Figure 10, certain parts thereof being shown in a different position of adjustment and certain other parts thereof cut away;

Figure 12 is a view of a modified form of system with which the structure shown in Figures 9 to 11, inclusive, may be advantageously utilized.

Similar reference characters designate similar parts throughout the several views of the drawings.

Figure 1:
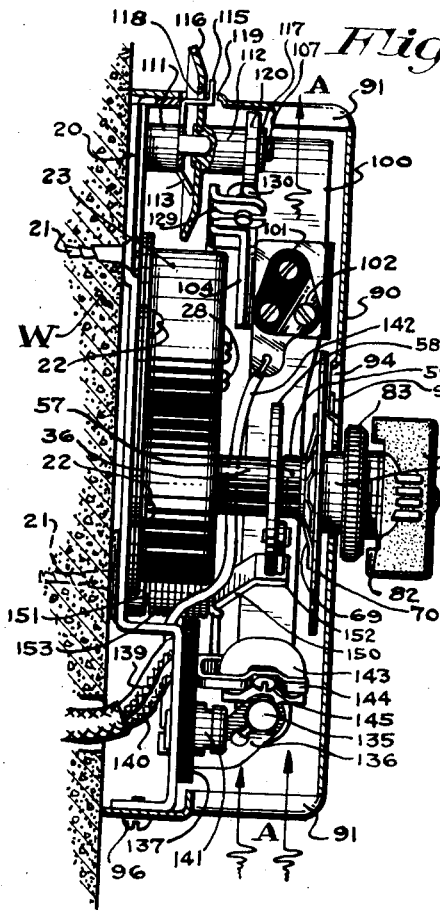
Figure 1 is a side sectional elevational view of one form of apparatus embodying this invention.

Referring now to the drawings, and more particularly to Figure 1, a base plate 20 is secured to a wall W or other suitable place as by means of screws 21 passed through suitable apertures in base plate 20. Secured to base plate 20 as by screws 22 is a casing 23 adapted to contain a clockworks generally indicated at 24 (see Figure 4), of any suitable form. In this connection, it may be pointed out that while any desired clockworks may be utilized the form shown in the copending application of Andrew G. McNicoll, Serial No. 98,288, filed of even date herewith and assigned to the same assignee is eminently suitable for this use. Clockworks 24 will be referred to hereinafter in connection with certain elements thereof but for a more complete understanding of the structure and its mode of operation, reference is made to the above mentioned application of Andrew G. McNicoll.

As better shown in Figure 4, clockworks 24 includes a rear plate 25 and a front plate 26 secured in related assembly as by spacers 27 and screws 28. A suitable main spring 29 mounted on a collet 34 secured to a shaft 33 drives the clock mechanism through a gear train including a first wheel 30 and a second wheel 31 and others (not shown). A suitable slip friction mechanism, generally indicated at 41, which is preferably of the type disclosed in the above referred to McNicoll application, is provided in order that main spring 29 may be tensioned or relieved of tension as desired in a manner to be more fully described hereinafter. A gear 32 is splined to shaft 33 and is adapted to mesh with a second gear 35 carried by a sleeve 36 and mounted for rotation on a pin 37 secured as by peening to front plate 26. Sleeve 36 carries a collar 38 having a projection 39 thereon adapted under circumstances hereinafter described to abut a projection 40 carried by the inner surface of casing 23.

A suitable starting mechanism which may advantageously be of the type described in the above mentioned McNicoll application is also provided in order that when sleeve 36 is rotated to set the mechanism in a manner to be described hereinafter, clockworks 24 may be started simultaneously therewith. Briefly, the mechanism comprises a toothed pinion 50 mounted on an axle 51 which carries a collar 52 which in turn carries a pair of spring arms 53 adapted to engage the balance wheel 54 of clock mechanism 24, a spring 55 being positioned to abut pinion 50, all as are more fully shown in Figure 5. The operation of the structure is set forth in detail in the above mentioned McNicoll application and reference is hereby made to the said application for a more complete understanding thereof. Briefly, however, as sleeve 36 is rotated in a manner to be described hereinafter, gear 35 rotates therewith and the teeth of gear 35 engage toothed pinion 50 causing arms 53 to rotate, with a snap imparted by the abutment of spring 55 with toothed pinion 50 past balance wheel 54 in order to impart initial impetus thereto to overcome any friction or inertia in component parts, the impetus being continued by the tension of main spring 29.

Figure 3:
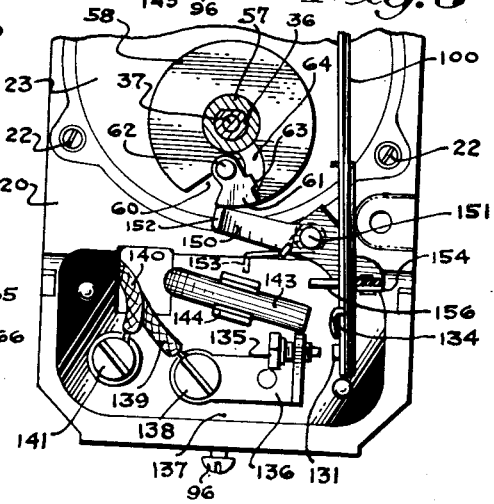
Figure 3 is a fragmentary view of certain portions of the structure shown in Figure 2 in a different position of adjustment, certain other parts being removed.

Sleeve 36 has a flattened portion 56 at one portion of its periphery whereon is mounted a collar 57 to which is rigidly secured a cam 58. A set screw 59 passed through a suitable aperture in collar 57 precludes linear movement thereof, flattened portion 56 preventing rotative movement about sleeve 36. As better shown in Figure 3, cam 58 comprises a substantially circular disk having a cut-away portion 60 having inclined sides. A lug 61 is pivotally mounted as by a pivot 62 adjacent portion 60 and has an inwardly depending portion 63 engaging in a groove 64 in cam 58 to limit the pivotal movement thereof.

Mounted about collar 57 is a resilient spring washer 69 which supports a dial 70, means being provided as will be hereinafter described to hold dial 70 inwardly against the pressure of disk 69. Dial 70 bears a series of suitable numerals on its outer surface. In the illustrative embodiment herein shown, these numerals range from 1 to 12 and the purpose thereof will be described hereinafter. A pair of opposed apertures 80 in dial 70 engage depending lugs 81 of a knob 82 having a knurled ridge 83 about its periphery. A relatively large aperture axially disposed through knob 82 is adapted to receive a depending sleeve 84 of an operating handle 85, adapted to be mounted as by means of splines 86 for rotation with sleeve 36. A screw 87 inserted through a suitable aperture in handle 85 and engaging with a threaded interior portion 88 (see Figure 5) of sleeve 36 serves to hold the parts in related assembly.

From the foregoing, it will be seen that rotation of handle 85 rotates sleeve 36 through splines 86 and through gear 35 in turn rotates gear 32 and shaft 33 to transmit motion to collet 34 and hence impart tension to or relieve tension on spring 29 depending upon the direction of rotation of the handle 85. It will be understood that slip friction mechanism 41 permits the unwinding of spring 29 without affecting clockworks 24 when handle 85 is rotated in a counterclockwise direction. It will also be seen that knob 82 may be rotated by means of knurled portion 83 independently of handle 85 and hence of sleeve 36 and that such rotation, imparted through lugs 81 and apertures 80 to dial 70, serves only to change the position of dial 70 since it is freely rotatable about collar 57. Moreover, it will be seen that rotation of handle 85 also serves to vary the position of cam 58 and its cut-away portion 60 for a purpose to be more fully described hereinafter. The pressure of spring disk 69 against dial 70, however, forces collar 82 into frictional engagement through a friction disk 89 (see Figure 4) with the inner surface of operating handle 85 in such manner that when sleeve 36 is rotated by spring 29 through clockworks 24, handle 85 is rotated through splines 86 and such rotation is imparted through collar 82 to dial 70.

Figures 8, 13:
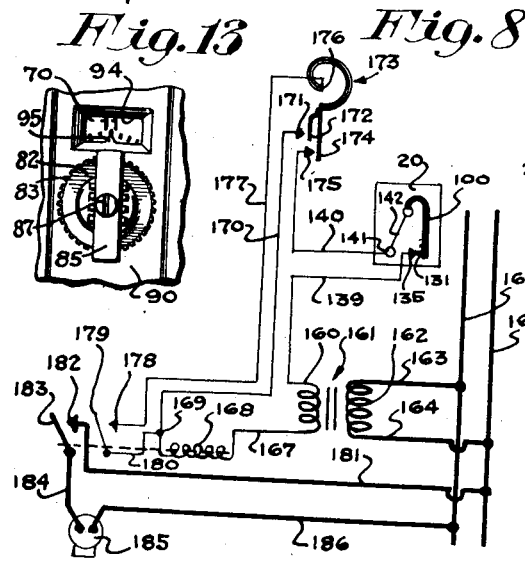
Figure 8 is a schematic view showing one form of system with which the mechanism of the instant invention may be advantageously utilized.
Figure 13 is a fragmentary elevational view of a portion of a casing adapted to contain the operating structure of the instant invention.

It may here be pointed out that the instrument is provided with a casing 90 secured by means of a screw 96 passed through a suitable aperture therein to base plate 20. Casing 90 has, at its upper and lower extremities, apertures 91 to permit the circulation of air about the interior mechanism, the direction of such circulation being indicated by the arrows A (see Figures 1 and 9). An aperture 92 of a diameter to permit the passage therethrough of a sleeve 93 comprising an integral part of knob 82 is also provided in casing 90. Likewise, as best shown in Figure 13, an aperture 94 is provided to permit certain of the numerals carried by dial 70 to be visible therethrough from the exterior of casing 90. A pointer 95 is centrally positioned with respect to aperture 94 and designates a specific numeral or indication, the purpose of which will be described hereinafter.

Figure 2:
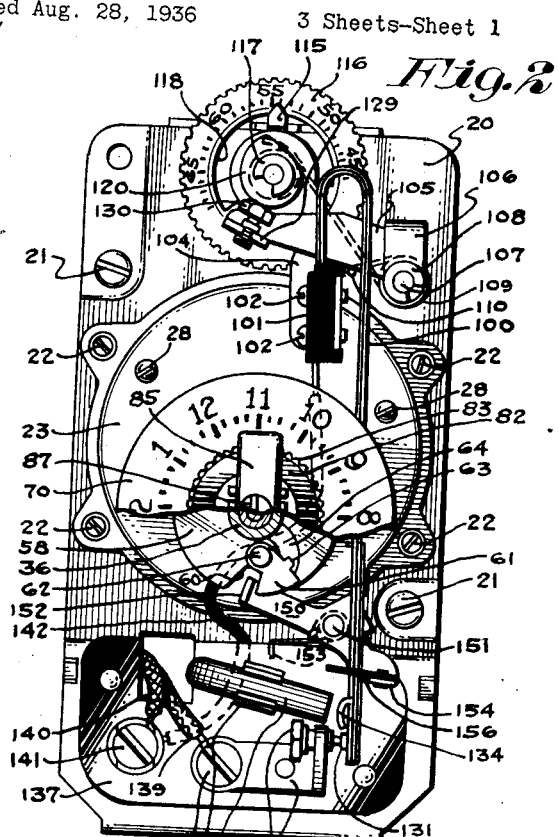
Figure 2 is a front elevational view of the structure of Figure 1, certain parts thereof being removed and certain other parts being cut away for the sake of clarity.

Referring back to Figures 1 and 2 a bimetallic element 100, one end of which is secured in an insulating block 101 as by screws 102 passed through suitable insulating washers (not shown) is mounted on a depending arm 104 forming a part of a member 105 which is mounted as by means of a U-shaped bracket 106 on a post 107 for pivotal movement thereabout. A spring clip 108 serves to hold bracket 106 in related assembly with post 107. A coil spring 109 positioned about post 108 has one end hooked behind member 105 as shown at 110. The other end of spring 109 abuts a post 111 having a reduced end on which a sleeve 112 is mounted for rotation. The arrangement is such that member 105 is biased by spring 109 in such a manner that it tends to rotate in a clockwise direction (as seen in Figure 2) about post 107 for a purpose to be later described. As better shown in Figure 1, post 111 has rigidly mounted thereon a spring clip 113 which has a form comprised of a plurality of resiliently extending arms one of which, 115, is bent forwardly to form a pointer. The other arms of spring clip 113 serve to hold resiliently an indicating dial 116 mounted on sleeve 112 against a spring clip 117. Dial 116 has a groove 118 therein through which pointer 115 passes in such a manner as to be visible from the front of the device. The indicia carried by dial 116 may take a form to correspond to the degrees of temperature at which it is desired to set the mechanism. A suitable aperture 119 in casing 90 permits the passage therethrough of the uppermost portions of dial 116 and pointer 115 whereby they are visible from the exterior of casing 90. A cam 120 is rigidly secured to sleeve 112 and adapted to abut an adjustable screw 130 carried by an extending portion 129 of member 105.

Thus, it will be seen that spring 109 serves to force member 105 and screw 130, carries thereby, normally into abutting relation with cam 120 and that such force acting through member 104 serves to hold the end of bimetallic element 100 opposite insulating block 101 in a given position. As dial 116 is rotated, cam 120 is rotated therewith and as its high portion abuts screw 130 and end of bimetallic element 100 opposite insulating block 101 is forced in one direction against the pressure of spring 109 and, correspondingly, as the low-portion of cam 120 abuts screw 130 the said end of bimetallic element 100 is forced in the opposite direction by spring 109, screw 130 likewise being held in abutting relation with cam 120 thereby. Screw 130 may be readily adjusted by rotation to vary the position of member 105 for any given position of cam 120 in order to provide accurate calibration of the instrument in a manner to be hereinafter described.

As better shown in Figure 6, a spring leaf member 132 is secured as by a rivet 133 to the rear face of bimetallic element 100. A contact 131 is secured to member 132 and passed through a suitable aperture in element 100. A metallic arm 134 is also secured as by a rivet 128 to bimetallic element 100 in a position adjacent contact 131. Opposed to contact 131 is a contact screw 135 mounted in a suitable bracket 136 secured to an insulating block 137 carried by panel 20. A terminal screw 138 in electrical contact with bracket 136 and hence contact screw 135 engages one end of a lead wire 139. A second lead wire 140 leads to a second terminal screw 141 from which a wire 142 leads through insulating block 101 to electrical contact with the end of bimetallic element 100 secured thereto. A magnet 143 is supported in a suitable bracket 144 and held by a screw 145 in a position adjacent arm 134 to impart a relative snap action to the movement of bimetallic element 100 and hence to contact 131 in a well known manner. Thus, it will be seen that as contact 131 engages contact screw 135, a circuit comprising, in the instrument, wire 140, terminal 141, wire 142, bimetallic element 100, spring leaf member 132, contact 131, contact screw 135, member 136, terminal 138 and wire 139, is closed.

The parts hereinbefore described with one exception to be hereinafter described have been common to both modifications of the device as shown in the accompanying drawings. Now, however, having particular reference to the modification shown in Figures 1 to 7, inclusive, a bell-crank member 150 is mounted on a pivot 151 and has an extending projection 152 adapted to abut the surface of cam 58, such abutment being assured by the action of a coil spring 153 positioned about post 151. The opposite end of bell-crank lever 150 has an upwardly turned portion 154 which has secured thereto, as better shown in Figure 5, a U-shaped insulating block 156, the legs of the U being spaced apart a distance slightly greater than the width of bimetallic element 100. Insulating block 156 thus serves positively to hold contact 131 in engagement with contact 135 regardless of temperature fluctuations at all times during the inoperative period of the device or when projection 152 is juxtaposed to cut away portion 60. The legs of U-shaped insulating member 156 are spaced from the sides of bimetallic element 100 a distance less than the diameter of contact 131 and serve to preclude lateral displacement thereof with respect to contact screw 135 through accidental jars such as might occur in shipping or mounting the instrument.

From the foregoing, the operation of the device should now be apparent. Dial 116 is first rotated until a numeral indicative of the desired temperature to which the device will respond is adjacent pointer 115. Dial 70 is then rotated by means of knurled portion 83 of knob 82 until a number corresponding to the instant time of day is visible through aperture 94 adjacent pointer 95. Knob 85 is then rotated, such rotation being imparted to cam 58 through sleeve 57 and likewise through spring clip 69 to dial 70. When a number indicative of the time of day at which it is desired that the operation of the mechanism be discontinued is juxtaposed to pointer 95, rotation of handle 85 is discontinued and the position of cut-away portion 60 is such that it will rotate to a position adjacent projection 152 in a period corresponding to the number of hours between the time of day and the number opposite pointer 95 at the termination of the setting operation. The cam action of cam 58 against projection 152 moves lever 150 and hence insulating block 156 away from bimetallic element 100 which is now free to move in the manner above mentioned in response to temperature variations to engage contact 135 or to separate therefrom in accordance with the temperature conditions in the adjacent space as exemplified by the flow of air passing through apertures 91. It will correspondingly be seen that rotation of handle 85 imparts tension to main spring 29 in the manner above described, and through rotation of gear 35 and the starting mechanism previously described simultaneously starts clockworks 24. The tension imparted to spring 29 is gradually relaxed through the clockworks 24 which now rotates sleeve 36 and dial 58 in a counter-clockwise direction. Segment 61 rotates about its pivot 62 due to the force of gravity, partially covers cut-away portion 60 and increases the peripheral extent of the high portion of cam 58.

Segment 61 thus provides a means whereby contact 131 may engage contact screw 135 in a relatively rapid manner or with a snap action. It will be seen that upon manual rotation of handle 85, segment 61 may rotate about its pivot 62 in accordance with the pressure of projection 152 thereon in such manner that projection 152 rides gradually up the incline between the low portion and the high portion. However, upon reverse rotation of cam 58, segment 61 rotates as above described until it completely covers the incline between the high portion and the low portion of cam 58, thus providing a relatively sharp angle between the high portion and the low portion thereof. Accordingly, when cam 58 has rotated until projection 152 is adjacent the above mentioned extremity of segment 61, spring 153 will force projection 152 inwardly into juxtaposition with the low portion of cam 58 with an abrupt movement since the angle of travel is substantially a right or an acute angle with respect to a tangential line taken at a point coincident with the junction of the high portion with the incline leading thereto. Furthermore, it is essential that the cut-away portion 60 should be of a relatively small extent in order to provide a maximum time of operation for the instrument, and were pivoted segment 61 not provided, the angle of the aperture up which projection 152 is forced to ride would be so steep as to occasion the possibility of sticking or binding in the mechanism. A greater angle, as above pointed out, would provide not only a larger aperture and a consequent lesser period of operation but would also obviate the advantages achieved by the relative snap action imparted to contact 131 in the manner above described.

It may here be pointed out that cut-away portion 60 is in substantial alignment with projection 39 and likewise that projection 152 is in substantial alignment with projection 40, the arrangement being such, however, that there is a slight overrun of the clock mechanism before stop 39 abuts stop 40 after projection 152 has engaged cut-away portion 60. Thus, rotation of handle 85 and its relative position with respect to pointer 95 indicates not only the position of cut-away portion 60 but likewise of stop 39. After the clock mechanism has rotated cam 58 as above described until projection 152 has entered cut-away portion 60, the clockworks will run for a relatively short period, preferably sufficient only to insure continued rotation until such time as the contacts 131 and 135 have been closed in the manner above described whereupon the abutment of stop 39 with stop 40 will cause the operation of clockworks 24 to be discontinued.

It should here be pointed out that should it be desired to discontinue the operation of the mechanism at any time prior to the time for which the device is set, counter-clockwise rotation of handle 85 as seen in Figure 2, which is permitted by slip friction mechanism 41, will result in the immediate engagement of projection 152 with cut-away portion 60 and a consequent positive closure of contacts 131 and 135.

Referring now to Figure 8, wire 139 is disclosed as leading from contact 135 through the secondary 160 of a step-down transformer, generally indicated at 161, which includes a primary 162 connected through wires 163 and 164 to line wires 165 and 166, respectively. From secondary 160 a wire 167 leads through a relay coil 168 to a junction 169 and thence through a wire 170 to a contact 171 opposed to a contact 172 carried by a bimetallic room thermostat of standard design, generally indicated at 173. Thermostat 173 has a second contact 174 which is adapted to engage an opposed contact 175 to which wire 140 leads. Contacts 171—172 engage at a slightly lower temperature than contacts 174—175 in order to provide a slight operating differential in a well known manner. From the terminal 176 of thermostat 173, a wire 177 leads to a contact 178 cooperable with a relay switch arm 179 from which a wire 180 leads to junction 169. From line wire 166, a wire 181 leads directly to a contact 182 which cooperates with a second relay switch arm 183 from which a wire 184 leads to a stoker motor 185 or other analogous heat control mechanism. From stoker motor 185 a wire 186 leads to line wire 165. Thus it will be seen that in the system shown, contacts 131 and 135 are normally engaged when the mechanism herein described is not operating. Thermostat 173 is set for operation in a conventional manner and as contact 174 engages contact 175 and upon a further drop in temperature contact 172 engages contact 171, an energizing circuit is established, comprised of transformer secondary 160, wire 167, relay coil 168, junction 169, wire 170, contacts 171 and 172, 174 and 175, wire 140, terminal 141, wire 142, bimetallic member 100, contacts 131 and 135, wire 139 back to transformer secondary 160. Such energization of relay coil 168 pulls in relay switch arms 179 and 183 whereupon the engagement of arm 179 with contact 178 establishes a holding circuit comprised of transformer secondary 160, wire 167, relay coil 168, junction 169, wire 180, arm 179, contact 178, wire 177, terminal 176, thermostat 173 contacts 174 and 175, wire 140, terminal 141, wire 142, bimetallic element 100, contacts 131 and 135, wire 139 back to transformer 160. It may here be pointed out that upon a drop in temperature sufficient to separate contacts 171 and 172 the above described holding circuit is not broken and relay coil 168 is thus maintained energized until a continued drop in temperature causes contacts 174 and 175 to separate. Correspondingly, with the engagement of arm 183 with contact 182 a circuit through stoker motor 185 is also established, as will be readily apparent, however, when the mechanism is set in the manner hereinbefore described, bimetallic element 100 is free to move contact 131 away from contact 135. Consequently, when contacts 171 and 172 and 174 and 175 engage at a temperature of, illustratively, 70°, and 72° respectively, no circuit will be established since contacts 131 and 135 will remain open until the temperature has fallen to that to which the instrument of the instant invention is set. In Figure 2 for example, the mechanism is set at 55°. Assume this to be the case with the thermostatic mechanism shown in Figure 8. When the temperature has fallen to 55°, contact 131 engages contact 135 and the circuits previously described are completed. However, immediately upon a rise in temperature above 55°, illustratively, contacts 131 and 135 separate to break any circuits extending through relay coil 168 since it will be readily apparent that all circuits, energizing or maintaining, through relay coil 168 must pass through contacts 131 and 135. However, upon the termination of the timed period of operation when cam 58 has rotated to its off position, the engagement of projection 152 and cut-away portion 60 will permit spring 153 to move insulating block 156 and hence bimetallic element 100 and contact 131 inwardly with a snap action occasioned by segment 61 as above described into engagement with contact 135, whereupon stoker motor 185 will remain energized through the circuits previously described until the temperature has risen to illustratively 72° to break contacts 174 and 175 and thereafter operation of the device will be controlled through thermostat 173 until the mechanism of the instant invention is again manually set in operation.

Referring now to the modification shown in Figures 9, 10 and 11, there is substituted for the lever 150 a lever 190 which has an inturned projection 191, corresponding to projection 152 of lever 150, adapted under certain circumstances to engage with cut-away portion 60 of cam 58. Lever 190 has a downwardly depending portion 192 covered with insulating material 193 and positioned between the extending members of magnet 143, the arrangement being such that as a high portion of cam 58 abuts inwardly turned projection 191, insulation 193 surrounding downwardly depending portion 192 forces bimetallic element 100 and its contact 131 out of engagement with contact screw 135 and holds the same in such position regardless of temperature variations.

In this modification additional means are also provided whereby contact 131 may be continuously held from engagement with contact 135 regardless of the position of the timing mechanism and the consequent position of cam 58. Such means take the form of a lever 194 having an aperture 195 therein adapted to encircle sleeve 36. Projections 196 and 197 struck upwardly from lever 194 are adapted normally to clear cam 58 but to prevent slippage of lever 194 in a direction towards the right as viewed in Figure 9. Likewise, when lever 194 is forced downwardly in a manner to be described hereinafter, projection 197 is designed to abut projection 191 of lever 190 in such manner as to force the same downwardly and hence insulating member 193 outwardly against the pressure of a spring 198 which corresponds to spring 153. The upper end of lever 194 is provided with a forked portion comprised of legs 199 and 200 adapted to pass on opposite sides of sleeve 112', corresponding to sleeve 112. Leg 200 has formed thereon an upstanding lug 201 which is adapted under certain circumstances to be engaged by a projection 202 carried by sleeve 112'. In a dial 116' corresponding to dial 116, the lowermost temperature setting is replaced by an indication "off". The arrangement is such that when the indication "off" is adjacent pointer 115, projection 202 abuts projection 201 and consequently forces lever 194 downwardly, such movement as above stated being imparted through upstanding portion 197 to projection 191 and hence through lever 190 and its insulated portion 193 to bimetallic element 100 whereby contacts 131 and 135 are held separated until dial 116' is rotated out of its "off" portion to a position indicative of the fact that bimetallic element 100 is free to respond to temperature variations except as restricted by the operation of the timed mechanism.

As previously stated the structure shown in the modification immediately above described is designed for use in comparatively mild climates and may be advantageously utilized alone as controlling means for a burner obviating the necessity for a second thermostat as described in the previous specification. When desired, the owner may set the time mechanism for a period of from one to substantially twelve hours in accordance with the length of time he wishes the burner to be definitely inoperative, which period may correspond to the length of time he expects to be absent from home or the duration of the period from retiring to an hour just prior to arising, whereby the dwelling or other place may be adequately heated upon his return or in the morning. During the time the instrument described immediately above is set, contacts 135 and 131 will be unable to engage and, accordingly, no heat can be generated while the instrument is in operation. Similarly, in particularly warm weather by simply turning dial 116' to its off position the operation of the heating mechanism may be completely discontinued until such time as the instrument is reset. In Figure 12 there is disclosed a system wherein the structure shown in Figures 9 to 11 may be advantageously used. A conventional step-down transformer, generally indicated at 210, is comprised of a primary 211 and a secondary 212 and supplied with power from any suitable source (not shown). Wire 140 leads from secondary 212 to terminal 141 from which, as in connection with the system disclosed in Figure 8, wire 142 leads to bimetallic element 100. Contact 131 carried by bimetallic element 100 is positioned opposite contact screw 135 from which wire 139 leads to one terminal of a conventional mercury switch 213. Mercury switch 213 comprises a portion of a conventional high limit control, generally indicated at 214, and includes operating mechanism 215 actuated in a known manner by a volatile fluid filled bellows 216 in association with a controlling bulb 217 associated with the heating plant in a well known manner. A spring 225 serves to hold switch 213 in circuit closing position in the absence of pressure imparted to mechanism 215 by bellows 216. From the other terminal of mercury switch 213, a wire 219 leads to one end of a coil 220 surrounding a plunger 221 which operates a valve 222 positioned in a full supply line 223 leading to a burner 218. From the other end of coil 220 a wire 224 leads back to transformer secondary 212. Thus it will be seen that when contacts 131 and 135 are separated, valve 222 is closed. Valve 222 remains closed until such time as an energizing circuit, readily discernible from a consideration of Figure 12, is provided by closure of contacts 131 and 135. This circuit retains valve 222 open to provide fuel to burner 128 until such time as contacts 131 and 135 separate provided, of course, that during the interim the temperature in the heating system does not rise sufficiently to cause expansion of bellows 216 to tilt mercury switch 213 to circuit opening position. As above pointed out, contacts 131 and 135 may be held open either by means of the lever 194 or through the operation of the timer mechanism above described.

From the foregoing, it will now appear that there is thus provided an improved structure accomplishing the objects of the invention and others including many advantages of great practical utility.

As many modifications may be made in the inventive concept herein disclosed and as many changes may be made in the illustrative embodiment shown, it is to be understood that all matter hereinbefore described or disclosed in the accompanying drawings is to be interpreted as illustrative and not in a limiting sense.

I claim as my invention:

1. In a device of the character described, in combination, a condition responsive element, one end thereof being movable in accordance with condition change, contact means carried by the movable end of said element, second contact means in the path of movement of said first contact means, a timed operating mechanism, a shaft rotated by said mechanism, a cam carried by said shaft, a lever movable by said cam and positioned in the path of movement of said element, means associated with said shaft to predetermine the operating period of said mechanism, said means also positioning said cam with respect to said lever, and means associated with said lever positively to hold said element and hence said first contact means adjacent one of its limits of movement.

2. In a device of the character described, in combination, a condition responsive element, one end thereof being movable in accordance with condition change, contact means carried by the movable end of said element, second contact means in the path of movement of said first contact means, a timed operating mechanism, a shaft rotated by said mechanism, a cam carried by said shaft, a lever movable by said cam and positioned in the path of movement of said element, means associated with said shaft to predetermine the operating period of said mechanism, said means also positioning said cam with respect to said lever, and means associated with said lever positively to hold said element and hence said first contact means in engagement with said second mentioned contact means except during the operating period of said timed mechanism.

3. In a device of the character described, in combination, a condition responsive element, one end thereof being movable in accordance with condition change, contact means carried by the movable end of said element, second contact means in the path of movement of said first contact means, a timed operating mechanism, a shaft rotated by said mechanism, a cam carried by said shaft, a lever movable by said cam and positioned in the path of movement of said element, means associated with said shaft to predetermine the operating period of said mechanism, said means also positioning said cam with respect to said lever, and means associated with said lever positively to hold said element and hence said first contact means out of engagement with said second contact means during the operating period of said timed mechanism.

4. In a device of the character described, in combination, a timed operating mechanism, cam means rotatable by said timed operating mechanism, a lever movable by said cam means, a temperature responsive element adjacent said lever, a contact carried by said temperature responsive element, a fixed contact adjacent said first mentioned contact, said element causing opening and closing of said contacts upon temperature changes and means associated with said lever to hold said first and second contacts out of engagement regardless of temperature conditions during the operating period of said timed mechanism.

5. In a device of the character described, in combination, a condition responsive element, a contact carried by said element, a second contact adapted to engage said first mentioned contact, a timed operating mechanism, a cam rotatable by said mechanism, a lever movable by said cam carried by said lever, means to adjust the position of said condition responsive element whereby said first and second contacts engage and disengage at various condition values, and means to preclude the engagement of said contacts regardless of said condition value.

6. In a device of the character described, in combination, a bimetallic element, a timed operating mechanism, a cam rotatable by said timed operating mechanism, a lever adjacent said cam, spring means to hold one end of said lever adjacent said cam, the other end of said lever being positioned adjacent said bimetallic element, a contact carried by said bimetallic element, and a second contact adjacent said first mentioned contact, the arrangement being such that when said lever engages a low-portion of said cam said contacts are held in engagement by abutment of said lever with said bimetallic element but when said lever abuts a high-portion of said cam said contacts may open or close in response to temperature conditions.

7. In a device of the character described, in combination, a timed operating mechanism, a bimetallic element, a cam rotatable by said timed operating mechanism, a lever adjacent said cam and said bimetallic element, a contact carried by said element and a second contact adjacent said first mentioned contact, the arrangement being such that when said timed operating mechanism is in operation said contacts may separate or engage in response to temperature changes and when said timed operating mechanism is not in operation said lever holds said contacts in engagement, and means to vary the temperature value at which said contacts will separate or engage when said timed operating mechanism is in operation.

8. In a device of the character described, in combination, a timed operating mechanism, a bimetallic element, a cam rotatable by said timed operating mechanism, a lever adjacent said cam and said bimetallic element, a contact carried by said element and a second contact adjacent said first mentioned contact, the arrangement being such that when said timed operating mechanism is in operation said contacts may separate or engage in response to temperature changes and when said timed operating mechanism is not in operation said lever holds said contacts in engagement, and means to vary the temperature value at which said contacts will separate or engage when said timed operating mechanism is in operation, said last mentioned means comprising a rotatable cam and a member juxtaposed to said cam and associated with an end of said bimetallic element whereby rotation of said cam varies the position of said end of said bimetallic element, and hence the relative distance between said contacts at a given temperature value.

9. In a device of the character described in combination, a condition responsive element, a contact carried thereby, a second contact adjacent said first mentioned contact, means to vary the relative position of said first contact with respect to said second contact whereby said contacts will engage at varying condition values, a clock mechanism, a cam rotatable by said clock mechanism, a pivoted lever adjacent said cam and movable thereby and means associated with said lever to restrict the movement of said condition responsive element and hence said contact carried thereby in accordance with the position of said cam regardless of said condition value.

10. In a device of the character described in combination, a condition responsive element, a contact carried thereby, a second contact adjacent said first mentioned contact, means to vary the relative position of said second contact with respect to said first contact whereby said contacts will engage at varying condition values, said means comprising a rotatable cam and a lever associated with an end of said condition responsive element whereby rotation of said cam moves said lever to vary the position of said condition responsive element and hence said contact carried thereby, a clock mechanism, a second cam rotatable by said clock mechanism, a pivoted lever adjacent said second cam and movable thereby and means associated with said pivoted lever to restrict the movement of said contact carried by said condition responsive element in accordance with the position of said second cam regardless of said condition value.

11. In a device of the character described in combination, a condition responsive element, a contact carried thereby, a second contact adjacent said first mentioned contact, a clock mechanism, a sleeve rotatable by said clock mechanism, a dial carried by said sleeve, indicia on said dial, a fixed pointer adjacent a peripheral portion of said dial, a cam carried by said sleeve, a lever pivoted adjacent said cam and movable thereby, member carried by said lever to restrict the movement of said condition responsive element and hence said contact carried thereby in accordance with the position of said cam regardless of condition values, the arrangement being such that the position of the indicia carried by said dial with respect to said pointer indicates the relative position of said cam in respect to said lever.

12. In a device of the character described in combination, a condition responsive element, a contact carried thereby, a second contact adjacent said first mentioned contact, means to vary the relative position of said second contact with respect to said first contact whereby said contacts will engage at varying condition values, a clock mechanism, a sleeve rotatable by said clock mechanism, a dial carried by said sleeve, indicia on said dial, a fixed pointer adjacent a peripheral portion of said dial, a cam carried by said sleeve, a lever pivoted adjacent said cam and movable thereby, member carried by said lever to restrict the movement of said condition responsive element and hence said contact carried thereby in accordance with the position of said cam regardless of condition values, the arrangement being such that the position of the indicia carried by said dial with respect to said pointer indicates the relative position of said cam in respect to said lever.

13. In a device of the character described in combination, a condition responsive element, a contact carried thereby, a second contact adjacent said first mentioned contact, a cam, a lever adjacent said cam associated with said condition responsive element, the arrangement being such that rotation of said cam varies the position of said condition responsive element and hence said contact carried thereby whereby said contacts will engage under varying condition values, a clock mechanism, a second cam rotatable by said clock mechanism, an indicating dial rotatable with said cam, a second lever adjacent said second cam and movable thereby and means associated with said second lever to restrict the movement of said condition responsive element and hence said contact carried thereby in accordance with the position of said cam regardless of said condition value, the arrangement being such that the relative position of said indicating dial indicates the relative position of said second cam with respect to said second lever.

14. In a device of the character described in combination, a condition responsive element, a contact carried thereby, a second contact adjacent said first mentioned contact, a timed operating mechanism, a cam rotatable by said timed operating mechanism, a lever adjacent said cam and movable thereby, spring means to hold said lever adjacent said cam, insulating means associated with said lever to restrict the movement of said condition responsive element and hence said contact carried thereby in accordance with the position of said cam regardless of said condition value and means to indicate the relative position of said cam with respect to said lever.

15. In a device of the character described in combination, a condition responsive element, a contact carried thereby, a second contact adjacent said first mentioned contact, a timed operating mechanism, a cam rotatable by said timed operating mechanism, a lever adjacent said cam and movable thereby, spring means to hold said lever adjacent said cam, insulating means associated with said lever to restrict the movement of said condition responsive element and hence said contact carried thereby in accordance with the position of said cam regardless of said condition value and means to indicate the relative position of said cam with respect to said lever, said last mentioned means comprising a dial having time denoting numerals thereon and a pointer, said dial being rotatable with said cam when said cam is rotated by said timed operating mechanism but manually revolvable independently of said cam and said timed operating mechanism whereby said time denoting numerals may be utilized to indicate the duration of the operating period of the mechanism.

16. A device of the character described, comprising in combination, a condition responsive element, a contact carried thereby, a second contact carried adjacent said first mentioned contact, a timed mechanism, a cam rotatable by said timed mechanism, a lever adjacent said cam and movable thereby, means carried by said lever to restrict the movement of said condition responsive element and hence said contact carried thereby in accordance with the position of said cam regardless of the value of said condition and means carried by said cam to impart a snap action to the movement of said lever.

17. A device of the character described, comprising in combination, a condition responsive element, a contact carried thereby, a second contact carried adjacent said first mentioned contact, means to vary the relative position of said first mentioned contact with respect to said second mentioned contact whereby said contact will engage at varied condition values, a timed mechanism, a cam rotatable by said timed mechanism, a lever adjacent said cam and movable thereby means carried by said lever to restrict the movement of said condition element and hence said contact carried thereby in accordance with the position of said cam regardless of the value of said condition and means carried by said cam to impart a snap action to the movement of said lever.

18. In a device of the character described, comprising in combination, a condition responsive element, a contact carried thereby, a second contact carried adjacent said first mentioned contact, a timed mechanism, a cam rotatable by said timed mechanism, a lever adjacent said cam and movable thereby, means carried by said lever to restrict the movement of said condition element and hence said contact carried thereby in accordance with the position of said cam regardless of the value of said condition, and means associated with said cam to impart a snap action to the movement of said lever, said means including a spring associated with said lever.

19. In a device of the character described, comprising in combination, a condition responsive element, a contact carried thereby, a second contact adjacent said first mentioned contact, a timed mechanism, a cam rotatable by said timed mechanism, said cam having a high portion and a low portion, a lever adjacent said cam and movable thereby, means associated with said lever to restrict the movement of said condition responsive element and hence said contact carried thereby in accordance with the position of said cam and means carried by said cam to impart a snap action to the movement of said lever, said means comprising an inclined surface on said cam comprising a substantially right angle, and resilient means associated with said lever whereby upon juxtaposition of said right angle surface of said cam to said lever, said resilient means forces said lever abruptly from said high portion to said low portion.

20. In a device of the character described, comprising in combination, a condition responsive element, a contact carried thereby, a second contact carried adjacent said first mentioned contact, a timed mechanism, a cam rotatable by said timed mechanism, said cam having a high portion and a low portion, a lever adjacent said cam and movable thereby, means carried by said lever to restrict the movement of said condition responsive element and hence said contact carried thereby in accordance with the position of said cam regardless of said condition value, and means carried by said cam to impart a snap action to the movement of said lever, said means including a pivoted segment carried by said cam and constituting an extension of the high portion of said cam.

21. In a device of the character described, comprising in combination, a condition responsive element, a contact carried thereby, a second contact adjacent said first mentioned contact, a timed mechanism, a cam rotatable by said timed mechanism, said cam having a high portion and a low portion and an incline therebetween, a lever adjacent said cam and movable by rotation thereof, said lever serving to restrict the movement of said condition responsive element and hence said contact carried thereby in accordance with the position of said cam regardless of said condition value, and means associated with said cam to impart a snap action to the movement of said lever, said means comprising a pivoted segment carried by said cam adjacent said incline, and resilient means associated with said lever the arrangement being such that upon rotation of said cam in one direction said lever rides up said incline but upon reverse rotation of said cam said pivoted segment moves into the path of said lever whereby the angle of said incline is varied and said lever upon reaching the extremity of said pivoted segment moves to the low portion of said cam with an abrupt movement.

22. In a device of the character described in combination, a member to be moved in response to temperature variation, a mechanism controlled thereby, a second member to restrict the movement of said first mentioned member, a timed operating mechanism to control the position of said second member, means to vary the temperature value to which said first member responds, and means associated with said last mentioned means to actuate said second member to first member controlling position independent of said timed operating mechanism.

23. In a device of the character described in combination, a member to be moved in response to temperature variation, a mechanism controlled thereby, a second member to restrict the movement of said first mentioned member, a timed operating mechanism to control the position of said second member, means to vary the temperature value to which said first member responds, and means independent of said timed operating mechanism to restrict movement of said first mentioned member regardless of temperature conditions.

24. A device of the class described, comprising in combination, a member movable back and forth, said member having a cut-away portion which is connected to the other portion of said movable member by a gradual sloping inclined portion, a controlled member biased to engage said movable member and which assumes a first position when engaging the cut-away portion thereof and a sceond position when engaging any other portion thereof, and a pivoted member pivoted on said movable member and arranged to overlie said gradual sloping inclined portion whereby upon movement of said movable member in one direction said controlled member abruptly moves from the end of said pivoted member to the lowermost part of said cut-away portion.

25. In a device of the character described, in combination, a condition responsive element, a switch operable to both open and closed positions by said element, a timed operating mechanism, a manually operable setting means for said mechanism, and means cooperating with said mechanism for positively holding said switch in one of its positions for a length of time dependent upon the setting of said mechanism.

26. In a device of the character described, in combination, a condition responsive element, a mechanism operable to both of two controlling positions thereby, a timed operating mechanism, a manually operable setting means for said mechanism, and means cooperating with said timed operating mechanism for positively holding said first mentioned mechanism in one of its controlling positions for a length of time dependent upon the setting of said mechanism.

CARL G. KRONMILLER.